US008952753B2

(12) United States Patent
Tournatory et al.

(10) Patent No.: US 8,952,753 B2
(45) Date of Patent: Feb. 10, 2015

(54) DYNAMIC POWER SUPPLY EMPLOYING A LINEAR DRIVER AND A SWITCHING REGULATOR

(75) Inventors: David C. G. Tournatory, San Francisco, CA (US); Martin A. Tomasz, San Francisco, CA (US)

(73) Assignee: Quantance, Inc., San Mateo, CA (US)

( * ) Notice: Subject to any disclaimer, the term of this patent is extended or adjusted under 35 U.S.C. 154(b) by 0 days.

(21) Appl. No.: 13/385,406

(22) Filed: Feb. 17, 2012

(65) Prior Publication Data

US 2013/0214858 A1   Aug. 22, 2013

(51) Int. Cl.
*H03G 3/20* (2006.01)
*H03F 3/68* (2006.01)

(52) U.S. Cl.
USPC ............. 330/136; 330/103; 330/105; 330/79; 330/302

(58) Field of Classification Search
USPC ............................. 330/136, 103, 105, 79, 302
See application file for complete search history.

(56) References Cited

U.S. PATENT DOCUMENTS

| 3,671,846 | A |   | 6/1972 | Corey |  |
|---|---|---|---|---|---|
| 3,900,823 | A |   | 8/1975 | Sokal et al. |  |
| 4,097,773 | A |   | 6/1978 | Lindmark |  |
| 4,292,581 | A | * | 9/1981 | Tan | 323/283 |
| 4,346,349 | A |   | 8/1982 | Yokohama |  |
| 4,456,872 | A | * | 6/1984 | Froeschle | 323/286 |
| 4,636,927 | A | * | 1/1987 | Rhyne et al. | 363/15 |
| 4,686,448 | A |   | 8/1987 | Jones et al. |  |
| 4,697,160 | A |   | 9/1987 | Clark |  |
| 4,908,565 | A |   | 3/1990 | Cook et al. |  |
| 5,200,709 | A |   | 4/1993 | Saito et al. |  |
| 5,737,207 | A |   | 4/1998 | Uratani et al. |  |
| 5,905,407 | A |   | 5/1999 | Midya |  |

(Continued)

FOREIGN PATENT DOCUMENTS

GB     2409115 A      6/2005
JP     55-157356      5/1982

(Continued)

OTHER PUBLICATIONS

Anderson, D.R. et al., "High-Efficiency High-Level Modulator for Use in Dynamic Envelope Tracking CDMA RF Power Amplifier," 2001, pp. 1509-1512, IEEE MTT-S Digest.

(Continued)

*Primary Examiner* — Patricia Nguyen
(74) *Attorney, Agent, or Firm* — Fenwick & West LLP

(57) ABSTRACT

A highly efficient, high control bandwidth and high-speed power supply with a linear driver and a switching regulator for regulating an output based on a control signal. The linear driver has a first input for receiving the control signal and a second input connected to the output for receiving negative feedback. The driver's output is controlled by its two inputs and has a capacitor connected in series with it to generate a capacitor voltage $V_C$ responsive to the DC and low frequency components in the driver's output. The switching regulator has a control input and a regulator output connected in a regulator feedback loop. The control input receives capacitor voltage $V_C$ and the regulator feedback loop minimizes capacitor voltage $V_C$. Thus, switching regulator takes over the generation of DC and low frequency components, while the linear driver provides high frequency output current components.

15 Claims, 5 Drawing Sheets

(56) References Cited

U.S. PATENT DOCUMENTS

| | | | |
|---|---|---|---|
| 5,986,500 A | 11/1999 | Park et al. | |
| 6,028,476 A | 2/2000 | Schweighofer | |
| 6,084,468 A | 7/2000 | Sigmon et al. | |
| 6,097,614 A | 8/2000 | Jain et al. | |
| 6,130,525 A | 10/2000 | Jung et al. | |
| 6,175,273 B1 | 1/2001 | Sigmon et al. | |
| 6,191,653 B1 | 2/2001 | Camp, Jr. et al. | |
| 6,292,677 B1 | 9/2001 | Hagen | |
| 6,300,826 B1 | 10/2001 | Mathe et al. | |
| 6,518,856 B1 | 2/2003 | Casale et al. | |
| 6,529,073 B1 | 3/2003 | Highfill, III et al. | |
| 6,552,606 B1 * | 4/2003 | Veltman et al. | 330/10 |
| 6,580,258 B2 | 6/2003 | Wilcox et al. | |
| 6,594,163 B2 | 7/2003 | Tsai | |
| 6,597,242 B2 | 7/2003 | Petz et al. | |
| 6,639,816 B2 | 10/2003 | Liu | |
| 6,646,507 B1 | 11/2003 | Prokin et al. | |
| 6,654,261 B2 | 11/2003 | Welches et al. | |
| 6,661,210 B2 | 12/2003 | Kimball et al. | |
| 6,684,969 B1 | 2/2004 | Flowers et al. | |
| 6,711,034 B2 | 3/2004 | Duerbaum et al. | |
| 6,724,248 B2 * | 4/2004 | Llewellyn | 330/9 |
| 6,763,049 B1 | 7/2004 | Bees | |
| 6,774,719 B1 | 8/2004 | Wessel et al. | |
| 6,792,252 B2 | 9/2004 | Kimball et al. | |
| 6,825,726 B2 | 11/2004 | French et al. | |
| 6,984,969 B1 | 1/2006 | Liu et al. | |
| 7,058,373 B2 | 6/2006 | Grigore | |
| 7,113,038 B2 * | 9/2006 | Putzeys | 330/251 |
| 7,183,856 B2 | 2/2007 | Miki et al. | |
| 7,197,086 B2 | 3/2007 | Rauh et al. | |
| 7,454,238 B2 | 11/2008 | Vinayak et al. | |
| 7,547,995 B1 | 6/2009 | Andrews et al. | |
| 7,564,702 B2 | 7/2009 | Schlecht | |
| 7,583,065 B2 | 9/2009 | Xu et al. | |
| 7,583,149 B2 | 9/2009 | Funaki et al. | |
| 7,602,167 B2 * | 10/2009 | Trafton et al. | 323/284 |
| 7,671,699 B2 | 3/2010 | Wren | |
| 7,755,431 B2 | 7/2010 | Sun | |
| 7,764,054 B1 * | 7/2010 | Guo et al. | 323/224 |
| 7,859,336 B2 | 12/2010 | Markowski et al. | |
| 7,893,674 B2 | 2/2011 | Mok et al. | |
| 7,907,010 B2 | 3/2011 | Wendt et al. | |
| 7,907,014 B2 | 3/2011 | Nguyen et al. | |
| 7,921,309 B1 | 4/2011 | Isbister et al. | |
| 7,977,926 B2 | 7/2011 | Williams | |
| 8,008,902 B2 | 8/2011 | Melanson et al. | |
| 8,035,362 B2 | 10/2011 | Blanken | |
| 8,190,926 B2 | 5/2012 | Vinayak et al. | |
| 8,405,456 B2 | 3/2013 | Drogi et al. | |
| 8,553,434 B2 | 10/2013 | Coccia et al. | |
| 2003/0158478 A1 | 8/2003 | Petersen et al. | |
| 2004/0203982 A1 | 10/2004 | Barak et al. | |
| 2004/0263254 A1 | 12/2004 | Tahara et al. | |
| 2005/0064830 A1 | 3/2005 | Grigore | |
| 2006/0018136 A1 | 1/2006 | Takahashi | |
| 2007/0210771 A1 | 9/2007 | Wilson et al. | |
| 2008/0252380 A1 | 10/2008 | Blanken | |
| 2009/0044031 A1 | 2/2009 | Vinayak et al. | |
| 2009/0179698 A1 | 7/2009 | Ichitsubo et al. | |
| 2009/0184764 A1 | 7/2009 | Markowski et al. | |
| 2010/0250993 A1 | 9/2010 | Drogi et al. | |
| 2012/0194274 A1 | 8/2012 | Fowers et al. | |

FOREIGN PATENT DOCUMENTS

| | | |
|---|---|---|
| JP | 60-052607 | 11/1985 |
| JP | 01-137710 A | 5/1989 |
| JP | 04-129309 A | 4/1992 |
| JP | 2001-519612 | 10/2001 |
| JP | 2008-511065 A | 4/2006 |
| JP | 2008-537249 A | 9/2006 |
| WO | WO 99/18663 | 4/1999 |
| WO | WO 2004/112236 A1 | 12/2004 |
| WO | WO 2005/027297 A2 | 3/2005 |
| WO | WO 2005/041404 A1 | 5/2005 |
| WO | WO 2006/021790 A1 | 3/2006 |
| WO | WO 2006/111891 A1 | 10/2006 |

OTHER PUBLICATIONS

Araujo Samuel V., et al., "LCL Filter design for grid-connected NPC inverters . . . ", The 7th Intl. Conf. on Power Electronics, Oct. 22-26, 2007, p. 1133-1138, EXCO, Daegu, Korea.

Dadafshar Majid, "Drive RF Power Amplifiers with a High-Frequency Switching Regulator", EDN, Oct. 7, 2010, p. 22-27.

Dierburger, K. et al., "Simple and Inexpensive High-Efficiency Power Amplifier Using New APT MOSFETs," Nov. 1994, 14 pages, RF Expo East.

Erickson Bob, "Resonant Power Conversion", Fundamentals of Power Electronics, Chapter 19, 1997, Colorado Power Electronics Center, University of Colorado, Boulder.

Erickson Bob, "Quasi-Resonant Converters", Fundamentals of Power Electronics, Chapter 20, 1997, Colorado Power Electronics Center, University of Colorado, Boulder.

Hamill David C., et al., "A 'Zero' Ripple Technique Applicable to any DC Converter", PESC, IEEE, 1999, p. 1165-1171, vol. 2.

Li, Yushan, et al., "High Efficiency Wide Bandwidth Power Supplies for GSM and EDGE RF Power Amplifiers", ISCAS, 2005, p. 1314-1317, vol. 2.

Patterson Oliver D., et al., "Pseudo-Resonant Full Bridge DC/DC Converter", IEEE Transactions on Power Electronics, Oct. 1991, p. 671-678, vol. 6, No. 4.

Phinney Joshua, et al., "Filters with Active Tuning for Power Applications", IEEE Transactions on Power Electronics, Mar. 2003, p. 636-647, vol. 18, No. 2.

Raab Frederick H., Split-Band Modulator for Kahn-Technique Transmitters, IEEE MTT-S Digest, 2004, p. 887-890, vol. 2.

Raoufi Mustapha, et al., "Average Current Mode Control of a Voltage Source Inverter Connected to the Grid: . . . ", J. of Electrical Eng., 2004, p. 77-82, vol. 55, No. 3-4.

Wang Feipeng, et al., "An Improved Power-Added Efficiency 19-dBm Hybrid Envelope . . . ", IEEE Trans. on Microwave Theory and Techniques, Dec. 2006, p. 4086-4099, vol. 54, No. 12.

Williams Jim, "A Monolithic Switching Regulator with 100 μV Output Noise", Linear Technology, Application Note 70, Oct. 1997.

Chinese Office Action, Chinese Application No. 200780040407.5, Dec. 16, 2011, 7 pages.

European Examination Report, European Application No. 07813597.7, Nov. 10, 2011, 5 pages.

European Extended Search Report, European Application No. 07813597.7, Jul. 5, 2010, 12 pages.

International Search Report and Written Opinion, PCT/US07/74869, Jul. 29, 2008, 6 pages.

International Search Report and Written Opinion, PCT Application No. PCT/US10/29256, Jun. 1, 2010, 12 pages.

Japanese Office Action, Japanese Patent Application No. 2009-534729, Mar. 19, 2012, 4 pages.

Japanese Office Action, Japanese Application No. 2009-534729, Sep. 16, 2011, 7 pages.

Korean Office Action, Korean Patent Application No. 10-2009-7009869, Dec. 6, 2010, 6 pages.

Third Party Submissions, European Patent Application No. 07813597.7, Apr. 21 , 2010, 5 pages.

United States Office Action, U.S. Appl. No. 12/249,717, Feb. 15, 2011, 7 pages.

United States Office Action, U.S. Appl. No. 12/249,717, Nov. 29, 2011, 13 pages.

United States Office Action, U.S. Appl. No. 12/749,260, Jul. 11, 2012, 6 pages.

U.S. Appl. No. 13/385,405, filed Feb. 17, 2012, Inventor David C.G. Tournatory et al.

(56) References Cited

OTHER PUBLICATIONS

"BJT Differential Amplifier," eCircuit Center, 2004, pp. 1-5, [Online] [Retrieved on Mar. 21, 2013], Retrieved from the Internet<URL:http://www.ecircuitcenter.com/Circuits/BJT_Diffamp1.htm.

PCT International Search Report and Written Opinion, PCT Application No. PCT/US2013/024799, Apr. 22, 2013, 14 pages.
United States Office Action, U.S. Appl. No. 13/777,516, Apr. 24, 2013, 6 pages.
United States Office Action, U.S. Appl. No. 14/098,248, Mar. 4, 2014, 7 pages.

* cited by examiner

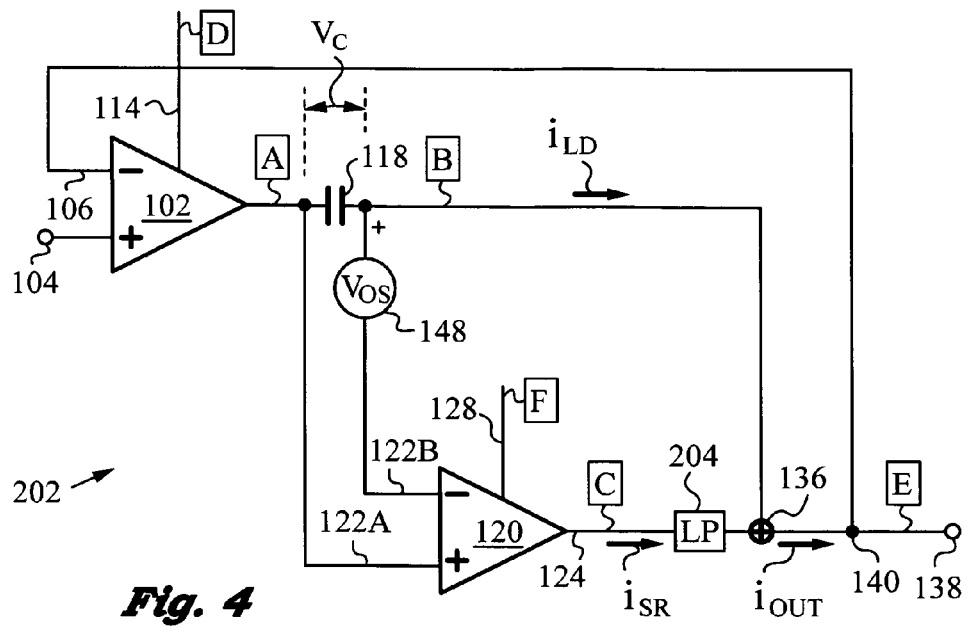
Fig. 4
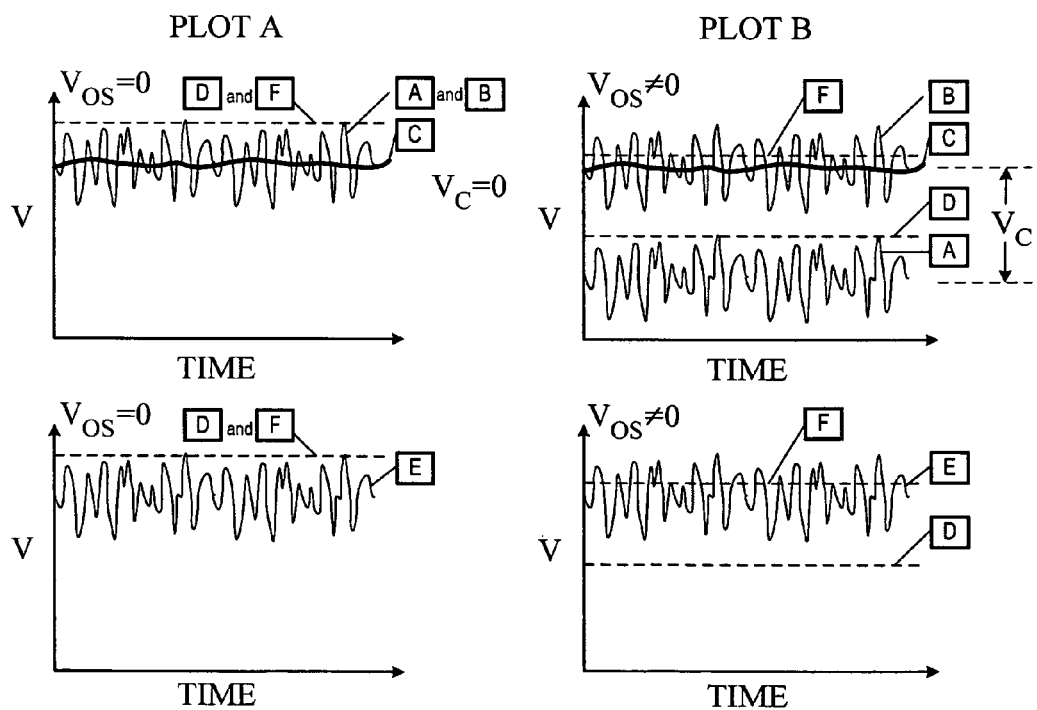
Fig. 5A  Fig. 5B

DYNAMIC POWER SUPPLY EMPLOYING A LINEAR DRIVER AND A SWITCHING REGULATOR

RELATED APPLICATIONS

This application is related to U.S. Application entitled "Low-Noise, High Bandwidth Quasi-Resonant Mode Switching Power Supply" filed on the same date.

FIELD OF THE INVENTION

This invention relates generally to dynamic power supplies utilizing linear drivers and switching regulators to provide output at high power efficiencies and over wide bandwidths.

BACKGROUND ART

There is often a need for a power supply circuit that is capable of delivering power with high frequency components (fast, dynamically changing voltage and current), at high overall power conversion efficiency. For example, a radio frequency (RF) power amplifier (PA), i.e., an RF PA, can be fed by an efficient power supply at a reduced voltage, allowing the PA to operate more efficiently (i.e., with lower power consumption).

In an envelope tracking system, the power supply feeds the PA with a variable voltage that tracks the output power envelope of the PA. This provides for a reduced voltage while still maintaining enough operating headroom for the PA's output stage to prevent saturation. Note that the power supply must be capable of changing the output voltage very quickly to accommodate rapid changes in the output power envelope of the PA. At the same time, a high overall efficiency is desired in the power supply to achieve the desired lower power consumption.

A typical switched-mode power supply (SMPS) circuit achieves high efficiency. Unfortunately, it cannot deliver sufficiently high frequency components of the power, because the low switching frequencies commonly used in these types of regulators (a limitation largely imposed by the magnetic and switching losses) bound the regulator's bandwidth. Linear regulators, on the other hand, may be designed to deliver high frequency components, but the power conversion efficiency of such linear regulators is poor. Thus neither a common SMPS nor a linear regulator can meet this need.

Another example of the need for a power supply that is both efficient and can deliver a fast changing voltage and current is one that supplies a digital circuit, which may include a microprocessor. The digital circuit may operate more efficiently if fed by a power supply that adjusts its voltage dynamically to match the predicted processing needs.

Typically, the voltage is adjusted upward when the digital circuit is operating at high speeds, and downward when operating at lower speeds. While conventional power supplies can typically change their voltage within 50 ms, this delay may prevent the digital circuitry from operating at peak efficiency. A power supply that adjusts its voltage more quickly to allow for a more frequent change in clocking speeds of the digital circuitry is desirable.

Further, minimal or low voltage ripple is desirable in switching power supplies. For example, modern microprocessors are increasingly operated at low voltages due to increased chip density and lower voltage breakdown in advanced CMOS (Complementary Metal Oxide Semiconductor) technology. At these low voltages, the power supply ripple may be a substantial portion of the supply voltage. High ripple may undesirably require the power supply output voltage to be raised above the optimal level in order to ensure that the microprocessor is supplied with the minimal voltage required during periods when the ripple voltage drives the voltage excursions to a minimum. As an additional example, an RF PA requires its power supply to exhibit low ripple at its output. Ripple typically occurs synchronously with the switching frequency of the switching regulator and can feed through to the output of the PA, causing unwanted distortion in the RF output signal.

There have been some efforts to improve the conventional switching regulator circuits. For example, some prior art suggests the use of both a switching regulator and a linear regulator that feed a simple summing node to form the output of the power supply. The intention of such combination is for the linear regulator to provide the high frequency, and the switching regulator to provide the low frequency and DC components of the current to the load. These circuits, however, place a high burden on the linear regulator, as it requires the linear regulator to supply a large amount of excess current to modulate the voltage in the large reservoir capacitors needed by the switching regulator. Alternatively, a switching regulator and linear regulator may be placed in series, with the switching regulator's output feeding the linear regulator's input. In this arrangement, the linear regulator may be capable of delivering high frequency components of the power, while the switching regulator may deliver power efficiently to the linear regulator. However, this series arrangement forces all the power delivered to the load to pass through the linear regulator, causing power dissipation in the linear regulator and substantially reducing the overall efficiency of the power supply.

Therefore, there remains a need for a dynamic power supply system that has high overall efficiency, high bandwidth, and low voltage ripple.

SUMMARY OF THE INVENTION

The objects and advantages of the invention are secured by a dynamic power supply for regulating a power output by a control signal. The dynamic power supply has a linear driver with a first driver input, a second driver input and a driver output. The first driver input is connected to receive the control signal, which has a certain bandwidth and includes DC. The second driver input is connected to the power output for receiving a negative feedback. The driver output generates a driver output current in response to its two driver inputs.

The dynamic power supply has a capacitor connected in series with the driver output for generating a capacitor voltage that is responsive to the DC and low frequency current components present in the driver output. The dynamic power supply is further equipped with a switching regulator having a control input and a regulator output connected in a regulator feedback loop. Now, the control input of the switching regulator is connected to receive the capacitor voltage and the regulator feedback loop is designed to minimize the capacitor voltage. More specifically, the switching regulator attempts to counteract the capacitor voltage at its regulator output. To accomplish this, the switching regulator generates at its regulator output current that forces the DC current component of the capacitor to be zero. The result is that switching regulator contributes DC and low frequency current components to the power output.

The power output of the dynamic power supply is obtained by combining the driver output current and the regulator output current. A combiner located before the power output performs the corresponding current combining task. In practice, a wired summing node is an appropriate implementation of a combiner.

In one specific embodiment, the switching regulator is a step-down buck regulator. In the same or a different embodiment, the linear driver is a push-pull type linear driver. Of course, any suitable DC-DC regulator, also referred to as switched-mode power supply (SMPS) or simply switcher by those skilled in the art may be employed by the dynamic power supply of the invention. The same is true for the choice of linear driver, also referred to as a linear regulator.

In a preferred embodiment, the control input of the switching regulator that receives the capacitor voltage further receives a voltage offset. The voltage offset is produced by an offset voltage source, summed with the capacitor voltage and applied to the control input. The addition of the voltage offset at the control input generates a desirable DC offset in the driver output. Preferably, the dynamic power supply also has a regulator for efficiently stepping down a driver supply voltage from a first input voltage source based on that DC offset. In other words, the driver supply voltage can be reduced in this embodiment.

In many embodiments, the first input voltage source is a battery, e.g., when the dynamic power supply is deployed in a mobile and power-efficient device. In these cases, the driver supply voltage can be stepped-down with an efficient switching regulator, thus improving the overall efficiency of the driver. Meanwhile, the battery supplies a switching regulator supply voltage without any voltage step-down or adjustment. Alternatively, the sources may be different; i.e., the first input voltage source supplies the driver while a second input voltage source is connected to the switching regulator for supplying it with a switching regulator supply voltage higher than the driver supply voltage.

In some embodiments the dynamic power supply has a low-pass filter connected in series with the switching regulator. Such filter is positioned before the combiner.

The invention further extends to a method for regulating a power output of a dynamic power supply by a control signal. The method calls for providing a linear driver having a first driver input, a second driver input and a driver output. The first driver input is connected to receive the control signal, which has a certain bandwidth, and to output a driver output current at the driver output. The second driver input is connected to the power output for receiving a negative feedback.

Thus, the invention provides a highly efficient, high control bandwidth (dynamic) power supply in which the switching regulator provides DC and low frequency output current components at high efficiency. Meanwhile, the linear driver provides the high frequency output current components that the switching regulator cannot provide. Additionally, since the linear driver takes feedback from the power output, any voltage ripple imposed by the switching regulator within the bandwidth of the linear driver (in-band noise) is removed by the linear regulator.

In accordance with the method of invention, a capacitor is connected in series with the driver output for generating a capacitor voltage that is responsive to DC and low frequency current components in the driver output current. A switching regulator having a control input and a regulator output connected in a regulator feedback loop is provided to generate a regulator output current that contains the DC and low frequency current components. This is ensured, when the control input receives the capacitor voltage and the regulator feedback loop acts to minimize the capacitor voltage by generating the desired regulator output current with the DC and low frequency current components. The regulator output current thus generated and the driver output current are combined to yield the power output.

The method of invention can be used in RF power amplifiers practicing EER (Envelope Elimination and Restoration) also known as the Kahn technique. In those embodiments, the power output is delivered to a supply voltage rail of an RF power amplifier. The control signal is an amplitude signal intended for modulation of an RF carrier. In still other embodiments, the power output is used to adjust an RF power amplifier supply voltage in accordance with the amplitude of an RF signal that is to be amplified. The RF power amplifier that amplifies the signal is thus able to operate without unnecessary voltage overhead in its supply voltage, thus reducing overall power consumption.

Furthermore, the method of invention extends to generating a voltage offset at the power output via the switching regulator. This permits operation in a mode where the peak voltage provided by the linear driver is exceeded. Preferably, a voltage offset level is provided from an offset voltage source to the control input of the switching regulator. The result is a DC offset introduced by the switching regulator and thus a reduced voltage at the driver output. It is further desirable in embodiments that introduce the voltage offset, to supply the linear driver with a lower supply voltage, correspondingly stepping down an input voltage source utilizing a switched-mode regulator such that it applies an efficient stepped-down driver supply voltage to the linear driver.

Finally, the invention extends to dynamic power supplies operating in a voltage mode. Rather than detecting the DC and low frequency current components of a current signal, in the voltage mode the dynamic power supply detects the DC and low frequency voltage components in the driver output voltage. The switching regulator has its control input and regulator output connected in a regulator feedback loop, where the control input is connected to an offset voltage source and to the node.

The switching regulator then regulates its regulator output to minimize the difference between the driver output voltage and an externally-supplied offset voltage utilizing a regulator feedback loop. More specifically, the switching regulator attempts to counteract differences between the driver output voltage and the offset voltage. To accomplish this, the switching regulator generates at its regulator output a regulator output voltage that satisfies the driver's feedback loop and thus force the driver's DC output voltage to equal the offset voltage.

A summing transformer is employed for combining the driver output voltage and the regulator output voltage to yield the power output in voltage mode embodiments. A regulator for stepping down the driver supply voltage from the first input voltage source to a lower supply voltage based on the DC offset can also be deployed in these embodiments.

Clearly, the apparatus and methods of invention find many advantageous embodiments. The details of the invention, including its preferred embodiments, are presented in the below detailed description with reference to the appended drawing figures.

BRIEF DESCRIPTION OF THE DRAWING FIGURES

FIG. 4 is a diagram of a dynamic power supply similar to that of FIG. 1 and illustrating several additional aspects of the invention.

FIGS. 5A-B are voltage plots illustrating the additional advantageous aspects of the invention based on the power supply of FIG. 4.

Figure 6:
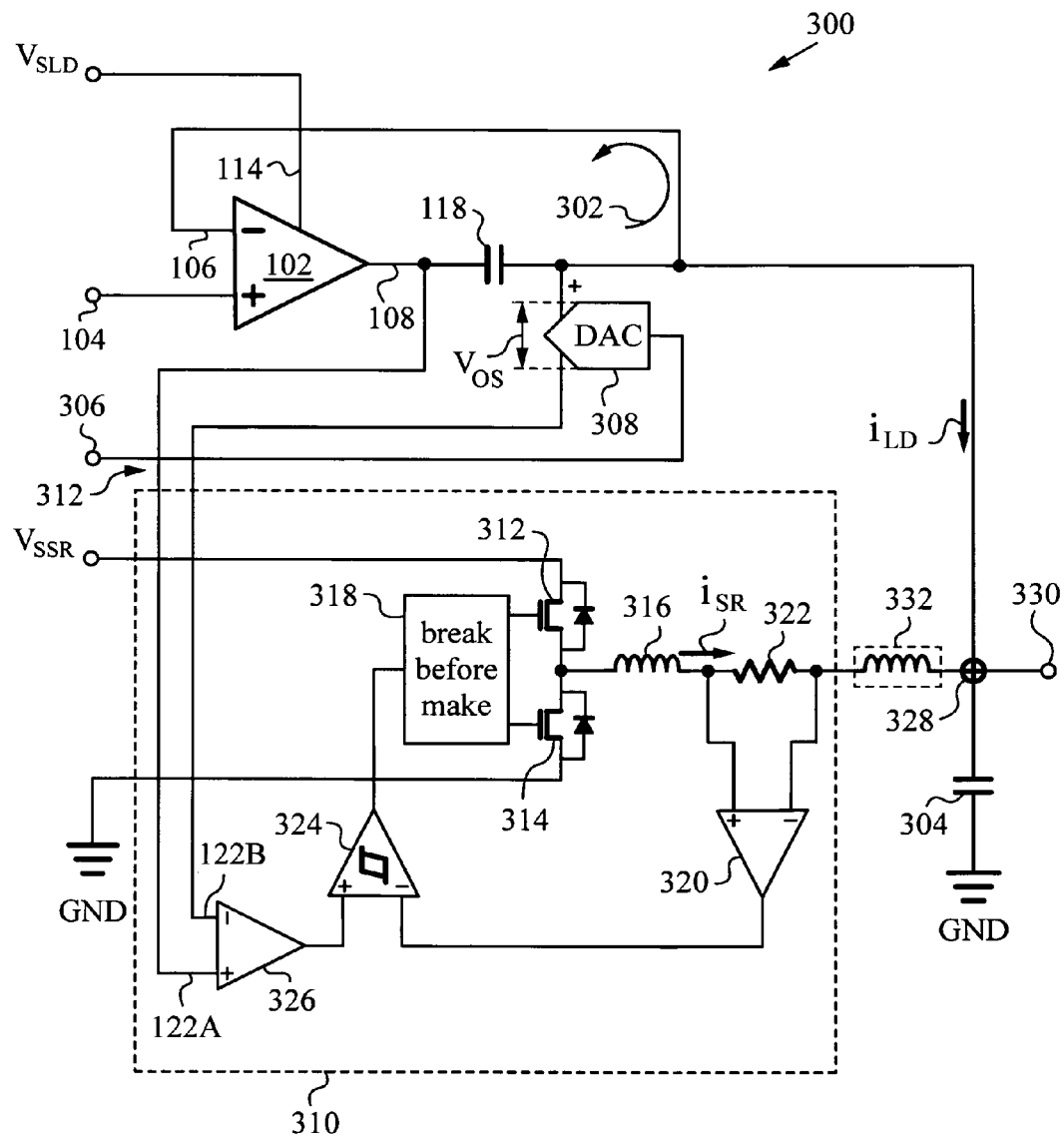

FIG. 6 is a diagram of another embodiment of a dynamic power supply in according accordance with the invention.

Figure 7:
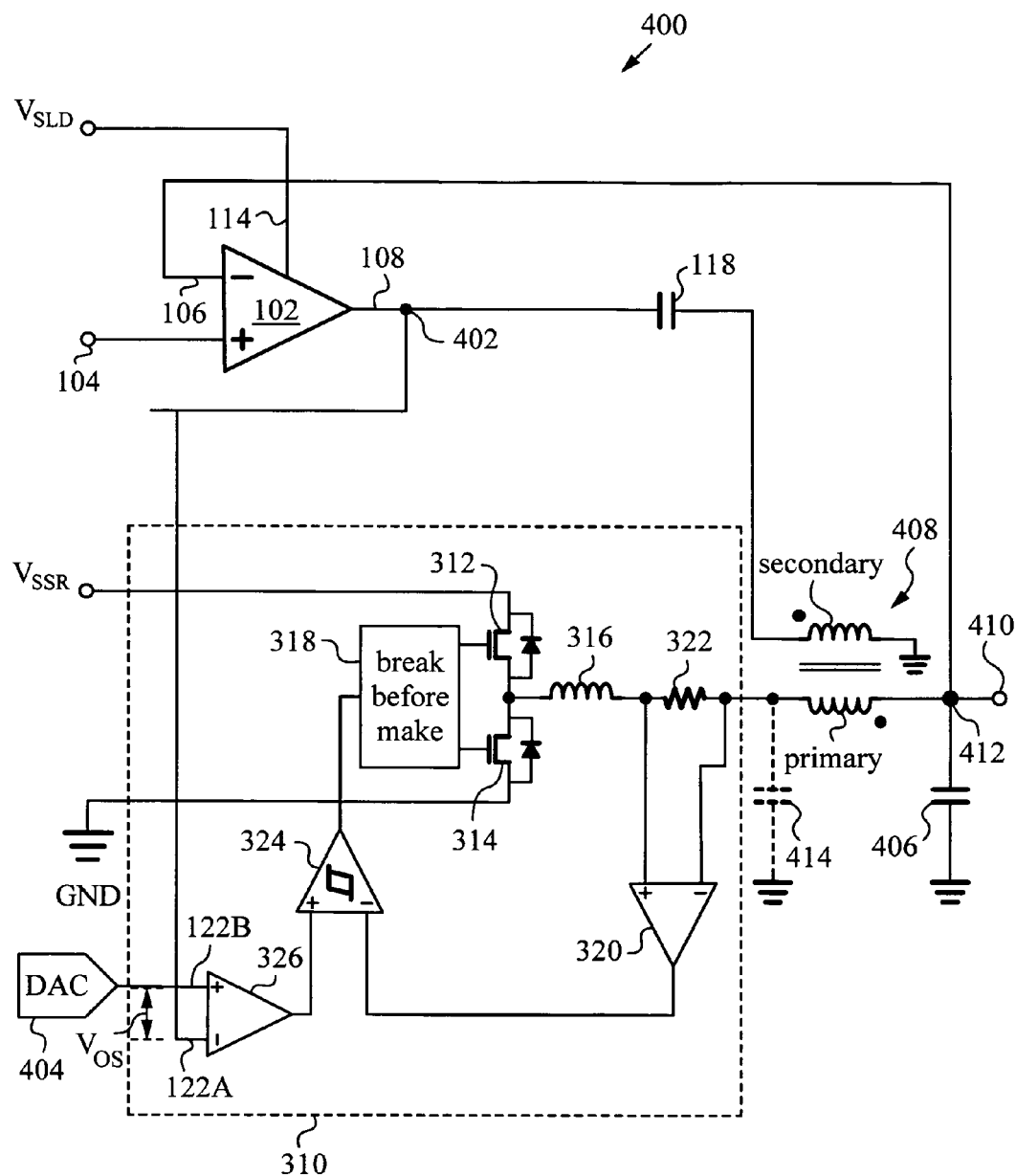

FIG. 7 is a diagram of still another embodiment of a dynamic power supply according to the invention designed to operate in the voltage mode.

DETAILED DESCRIPTION

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable, similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
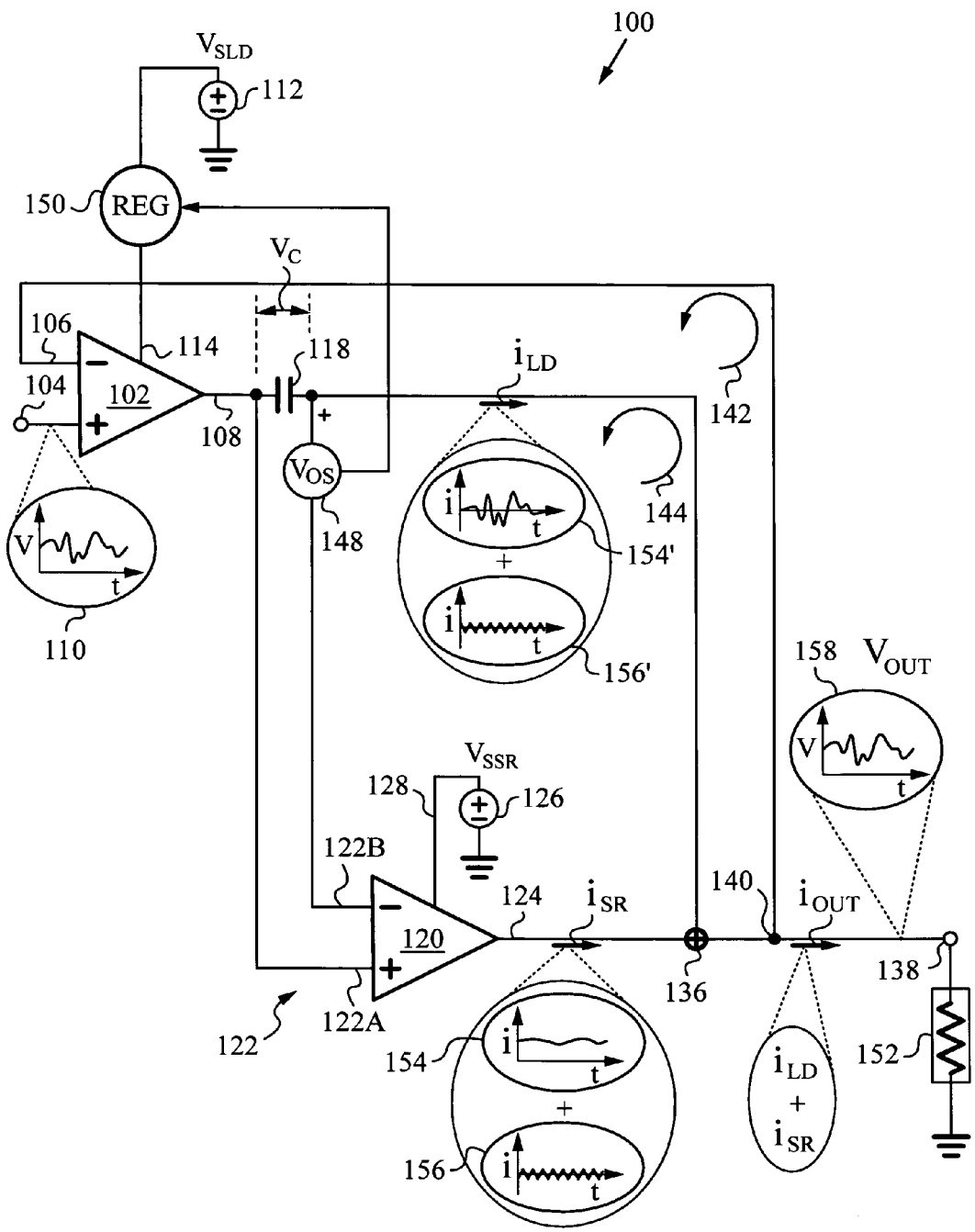
FIG. 1 is a diagram of a dynamic power supply illustrating several main aspects of the invention.

The present invention will be best understood by first reviewing a diagram of a dynamic power supply 100 in accordance with the invention, as shown in FIG. 1. Power supply 100 has a linear driver 102, also referred to as a linear regulator. Linear driver 102 has a non-inverting input, referred to herein as a first driver input 104, and an inverting input, referred to herein as a second driver input 106. Linear driver 102 further has a driver output 108 that provides a driver output current $i_{LD}$ proportional to a voltage difference between its inverting and non-inverting inputs 106, 104.

Typically, linear driver 102 is a push-pull type linear driver, providing an output capable of both sourcing and sinking current. Of course, other types of linear drivers may be deployed as will be appreciated by those skilled in the art. First driver input 104 is connected to receive a control signal 110. Control signal 110 controls the overall desired output voltage of dynamic power supply 100 as described below. Furthermore, control signal 110 is a dynamic signal, meaning that it is variable and covers a wide bandwidth. For example, control signal 110 may contain varying frequency components ranging from DC to 20 MHz.

A first input voltage source 112 is connected to a supply rail 114 of linear driver 102. Voltage source 112 provides a driver supply voltage $V_{SLD}$. Thus, the power delivered to driver output 108 is derived from voltage source 112.

Dynamic power supply 100 is further equipped with a switching regulator 120. Switching regulator 120 is a DC-DC regulator, also referred to as a switched-mode power supply (SMPS), DC-DC converter or simply switcher. In the present embodiment, switching regulator 120 is a step-down buck regulator. Of course, other switching regulator topologies can be deployed, including step-up, inverting, and various transformer-based topologies. Also, switchers with various control techniques including pulse-width modulated (PWM), hysteretic, and sigma-delta modulated can be deployed, as will be appreciated by those skilled in the art.

Switching regulator 120 has a control input 122 and a regulator output 124. In the present embodiment, control input 122 consists of a non-inverting input 122A and an inverting input 122B. Regulator output 124 provides a regulator output current $i_{SR}$ at output 124 based on control input 122. More precisely, regulator output current $i_{SR}$ is positive when non-inverting input 122A is at a higher voltage than inverting input 122B. On the other hand, regulator output current $i_{SR}$ is negative when inverting input 122B is at a higher voltage than non-inverting input 122A.

Regulator 120 has an input power source shown here as second input voltage source 126 supplying a switching regulator supply voltage $V_{SSR}$. Voltage source 126 provides power to a supply rail 128 of switching regulator 120. The power delivered to regulator output 124 is thus derived from source 126.

Driver output 108 and regulator output 124 are joined or combined. Specifically, a combiner 136 is used to connect driver and regulator outputs 108, 124 with each other. Combiner 136 is preferably a wired summing node in the present embodiment. A power output 138 of dynamic power supply 100 is located after combiner 136 to receive the combined signal from driver and regulator outputs 108, 124 as provided by combiner 136.

Second driver input 106 of linear driver 102 is connected to power output 138 of dynamic power supply 100 via a node 140. Node 140 is a wired connection located after combiner 136 that closes a negative feedback loop 142 of driver 102 around power output 138. In particular, negative feedback loop 142 is established between driver output 108, via power output 138 to second driver input 106, which is the inverting input of driver 102.

Driver output 108 is configured to respond to input signal 110 delivered to its first driver input 104 and to negative feedback from power output 138 applied to its second driver input 106. In fact, by design, linear driver 102 attempts to keep the voltage difference between its first and second driver inputs 104, 106 at zero. It does so by adjusting driver output current $i_{LD}$ that it generates at driver output 108. As a result, driver output 108 strives to follow input signal 110 applied at its non-inverting first input 104.

In accordance with the invention, dynamic power supply 100 has a capacitor 118 connected in series with driver output 108. Thus connected, capacitor 118 responds to driver output current $i_{LD}$ by generating a capacitor voltage $V_C$ across its plates. Capacitor voltage $V_C$ as a function of time, $V_C(t)$, is related to driver output current $i_{LD}$ by the equation:

$$V_C(t) = -\frac{1}{C} \int i_{LD}(t) dt. \qquad \text{Eq. 1}$$

Therefore, voltage $V_C(t)$ across capacitor 118 corresponds to the integral of all the current components that make up driver output current $i_{LD}$.

The current components of driver output current $i_{LD}$ include DC and low frequency current components. Capacitor voltage $V_C(t)$ is responsive to DC and low frequency current components since capacitive impedance $Z_C$ ($Z_C=1/\omega C$, where $\omega$ is angular frequency) is highest at DC (infinite at $\omega=0$) and decreases as the frequency increases. Note from Eq. 1 that a positive DC component of current $i_{LD}$ decreases capacitor voltage $V_C$.

Control input 122 of switching regulator 120 is connected to capacitor 118 to receive capacitor voltage $V_C$ generated across it. Specifically, non-inverting input 122A and inverting input 122B are connected across capacitor 118 such that capacitor voltage $V_C$ is applied between inputs 122A, 122B. Control input 122 of switching regulator 120 is therefore controlled by capacitor voltage $V_C$, which then determines regulator output current $i_{SR}$ at regulator output 124. Note that the polarity of capacitor voltage $V_C$ will determine whether regulator output current $i_{SR}$ is positive or negative based on the operating principles of switching regulator 120 explained above.

Switching regulator 120 is connected in a negative regulator feedback loop 144. Feedback loop 144 is established between regulator output 124, combiner 136 and control input 122 of switching regulator 120. Notice that capacitor 118 is included in feedback loop 144.

In a manner similar to that of driver 102 in feedback loop 142, regulator 120 in feedback loop 144 strives to keep the voltage difference between its two inputs 122A, 122B at zero. It does so by adjusting regulator output current $i_{SR}$. If the voltage across inputs 122A, 122B is positive (non-inverting input 122A at higher voltage than inverting input 122B), then it commands a positive output current $i_{SR}$. Conversely, when the voltage across inputs 122A, 122B is negative (non-inverting input 122A at a lower voltage than inverting input 122B), regulator 120 commands a negative output current $i_{SR}$.

In this way, regulator 120 produces the proper output current $i_{SR}$ to produce a voltage across a load 152 to ensure that negative feedback loop 142 of driver 102 prevents driver 102 from sourcing DC and low frequency currents through capacitor 118, which would otherwise generate a nonzero capacitor voltage $V_C$.

Before discussing the operation of dynamic power supply 100, it should be noted that in the preferred embodiment, control input 122 further receives a voltage offset $V_{OS}$. Voltage offset $V_{OS}$ is placed in series with inverting input 122B and is produced by an offset voltage source 148 that is typically constant, i.e., DC. The application of voltage offset $V_{OS}$ at input 122B generates a desirable DC offset at regulator output 124.

In this case, regulator 120, striving to keep the voltage difference between its two inputs 122A, 122B at zero, causes capacitor 118 to charge to a DC voltage equal to $V_{OS}$. Also, regulator 120 produces the proper output current $i_{SR}$ to produce a voltage across load 152 to ensure that negative feedback loop 142 of driver 102 prevents driver 102 from sourcing DC and low frequency current components through capacitor 118, which would otherwise generate a capacitor voltage $V_C$ that deviates from the regulated DC voltage equal to $V_{OS}$.

In addition, the preferred embodiment also has a regulator 150 for stepping down driver supply voltage $V_{SLD}$ as a function of voltage offset $V_{OS}$. Regulator 150 is typically a DC-DC regulator that is connected to first input voltage source 112 that supplies driver input voltage $V_{SLD}$ through supply rail 114. The output voltage of regulator 150 is related to the voltage of offset voltage source 148, in that regulator 150 provides an output voltage that is reduced when voltage offset $V_{OS}$ of offset voltage source 148 is increased.

Dynamic power supply 100 shown in FIG. 1 delivers current to load 152. Load 152 represents any type of useful load, including a low-power circuit belonging to a mobile user electronic device. Such low-power circuits may benefit from a dynamic supply of power to maximize their power efficiency, presuming a varying supply voltage reduces overall power drain.

During operation, linear driver 102 of dynamic power supply 100 receives control signal 110 through first driver input 104. Since driver 102 is operating in negative feedback loop 142, driver output current $i_{LD}$ is commanded to follow control signal 110. That is because doing so satisfies the fundamental property of linear driver 102, namely that it strive to keep the voltage difference between its first and second inputs 104, 106 (non-inverting and inverting, respectively) at zero by adjusting $i_{LD}$.

Driver output current $i_{LD}$ contains a number of frequency components ranging from DC and low frequency components to high frequency components that may extend up to 20 MHz. As noted above, these DC and low frequency components generate capacitor voltage $V_C(t)$ across capacitor 118 that corresponds to their integrals. Meanwhile, high frequency current components of $i_{LD}$, e.g., those above about 100 kHz, do not contribute appreciably to capacitor voltage $V_C(t)$. It should be noted that these higher frequency components are outside the bandwidth of switching regulator 120.

To achieve the desirable results according to the invention, the capacitance C of capacitor 118 should be chosen to ensure low impedance $Z_C$ outside the bandwidth of switching regulator 120, while still providing a substantial reservoir for DC and low frequency current components in $i_{SR}$ commanded by switching regulator 120. Suitable capacitance may be chosen on the order of a few µF. Of course, a person skilled in the art will recognize that the actual value of capacitance C needs to be adjusted for each particular design of dynamic power supply 100.

Switching regulator 120 receives capacitor voltage $V_C(t)$ at its control input 122. Regulator 120 is in negative feedback loop 144 and strives to command regulator output current $i_{SR}$ to minimize capacitor voltage $V_C(t)$ to thus keep the voltage difference across its inputs 122A, 122B at zero. To accomplish this, switching regulator 120 generates at its regulator output 124 a regulator output current $i_{SR}$ that forces the DC current component of capacitor 118 to be zero. Thus, switching regulator 120 is able to take over the generation of DC and low frequency current components from linear driver 102.

Note that DC and low frequency current components are precisely those that linear driver 102 is not efficient at handling. In fact, supplying the DC component through driver 102 is highly inefficient, since driver 102 has a linear output stage, and therefore consumes large amounts of power from first input voltage source 112. In dynamic power supply 100 of the invention, however, switching regulator 120, which is very efficient at providing the DC component, takes over generation of DC and low frequency current components in its regulator output current $i_{SR}$.

Combiner 136 sums all current components in $i_{LD}$ and $i_{SR}$. It thus generates the power output.

Of course, integrating capacitor 118 in feedback loop 144 provides for very high gain at DC, with a 20 dB/decade frequency decline in output at higher frequencies. This means that switching regulator 120 will always have a high contribution at DC, with a rapidly declining contribution at higher frequencies, where linear driver 102 takes over.

Figure 2:
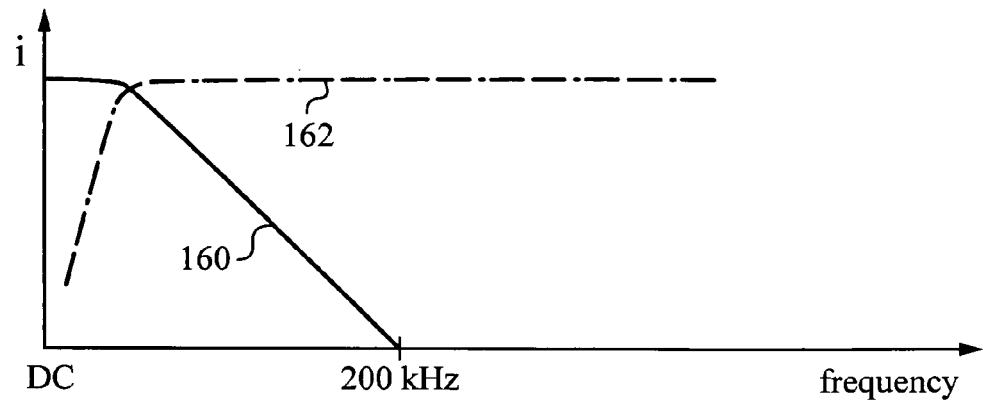
FIG. 2 are graphs of current frequency components contributed by the linear driver and switching regulator in the dynamic power supply of FIG. 1.

FIG. 2 illustrates the partitioning of current component contributions between linear driver 102 and switching regulator 120 over an entire operating range of dynamic power supply 100. Graph 160 illustrates the frequency components contributed to output current $i_{OUT}$ by switching regulator 120. Note that the DC component is provided entirely by switching regulator 120. Then, after an appropriate roll-off, graph 160 shows the contribution of regulator 120 dropping to zero by 200 kHz. That is the bandwidth of regulator 120. Meanwhile, graph 162 illustrates the frequency components contributed to output current $i_{OUT}$ by linear driver 102. The situation is the opposite, with no contribution at DC and contribution of all high frequency components above 200 kHz up to its bandwidth (e.g., up to 20 MHz).

Referring back to FIG. 1, regulator output current $i_{SR}$ is shown broken down into two parts. A first part 154 is made up of the DC and low frequency current components whose generation switching regulator 120 takes over from linear driver 102, as explained above. A second part 156 is a ripple due to the switching operation of regulator 120. More precisely, ripple 156 is a high frequency triangle current (usually about 1 MHz) and its higher harmonics, generated by internal magnetics of regulator 120. Persons skilled in the art will be familiar with this feature of switching regulators.

Meanwhile, a second part 154' of the useful output current is contained in driver output current $i_{LD}$. In particular, second part 154' contains the higher frequency current components that regulator 120 does not provide in regulator output current $i_{SR}$.

From the point of view of dynamic power supply 100, ripple 156 represents noise. The portion of noise 156 contained in the operating bandwidth of dynamic power supply 100 is called in-band noise. In-band noise 156 is carried along with the useful part 154 representing the DC and low frequency components of regulator output current $i_{SR}$ to combiner 136.

Combiner 136 sums driver output current $i_{LD}$ from driver output 108 and regulator output current $i_{SR}$ from regulator output 124 to yield output current $i_{OUT}$. In the process of driving load 152, an output voltage signal 158 at $V_{OUT}$ that corresponds to output current $i_{OUT}$ is registered at power output 138.

It is output voltage $V_{OUT}$ that is applied back to second driver input 106 of linear driver 102 in its negative feedback loop 142. As explained above, in striving to keep the voltage difference between inputs 104, 106 at zero, linear driver 102 is driven to ensure faithful reproduction of control signal 110 at its output 108.

At this point, another advantageous aspect of dynamic power supply 100 becomes clear. Namely, an inverse of noise or ripple 156, designated by reference 156' that is outside the bandwidth of switching regulator 120 is produced by linear driver 102. When summed by combiner 136, ripple 156 cancels with its inverse 156'. This is because undesirable noise 156 is produced within the control bandwidth of linear driver 102. Thus, the ripple voltage generated across load 152 from ripple current 156 originating from switching regulator 120 is cancelled in loop 142. Differently put, feedback loop 142 will act to eliminate or "clean up" in-band portion of noise 156 produced by switching regulator 120, since noise 156 is not contained in control signal 110 that linear driver 102 is striving to follow at its driver output 108.

Obviously, elimination of in band in-band noise or ripple 156 by linear driver 102 is a very desirable result. It ensures a cleaner output voltage 158 or $V_{OUT}$ at power output 138 that drives load 152. It should be noted, however, that in-band noise 156 or ripple outside the bandwidth of linear driver 102, which usually extends up to about 10-20 MHz, will not be cleaned up in this manner.

Figure 3A:
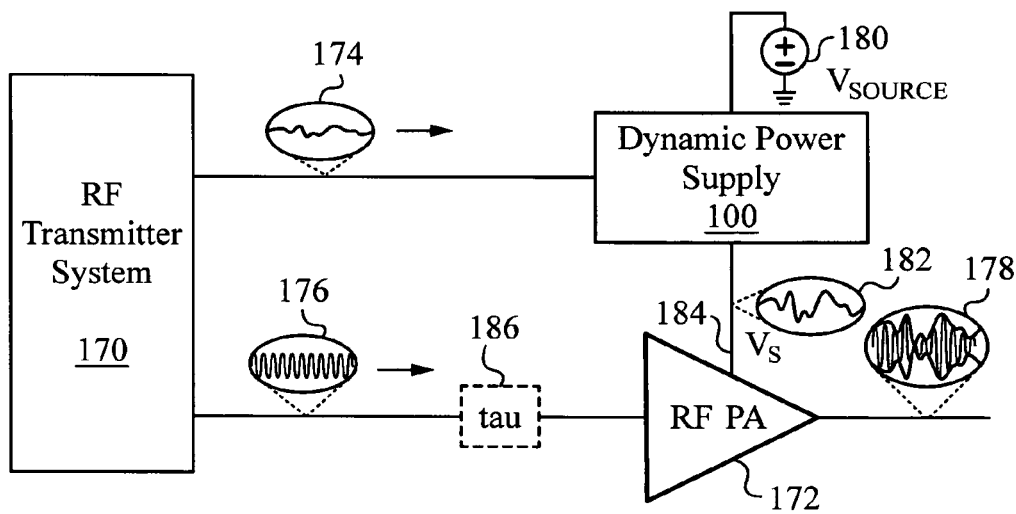
FIG. 3A is a diagram illustrating the deployment of a dynamic power supply according to the invention in conjunction with an EER (envelope elimination and restoration) RF transmitter system.

Dynamic power supply 100 as shown in FIG. 1 and analogous power supplies according to the invention can be used in many situations. For example, FIG. 3A illustrates how dynamic power supply 100 is deployed in an RF transmission system or radio system 170.

System 170 has an RF power amplifier 172 (RF PA) and employs the EER (Envelope Elimination and Restoration) technique, also known as the Kahn technique. In the case of system 170, the goal is to use dynamic power supply 100 to improve the efficiency of RF PA 172. For example, system 170 is a radio system such as a cellular transmitter that may reside in a smart phone or other mobile communications device.

System 170 provides an envelope signal 174 that is to be modulated onto a carrier signal 176 to produce an output signal 178. Output signal 178 is to be transmitted from an antenna (not shown). Any suitable modulation and encoding scheme that includes an amplitude modulated component known in the art and suitable for use with EER can be used in producing output signal 178 (e.g., quadrature modulation, QAM).

Envelope signal 174 is separated from carrier signal 176 in accordance with EER. Carrier signal 176 is typically in a high frequency band, e.g., 2 GHz. Meanwhile, envelope signal 174 may have a bandwidth of about 10 MHz.

Envelope signal 174 is sent to dynamic power supply 100 to serve as control signal 110 (see FIG. 1). Supply 100 operates as previously described to output a modulated voltage signal 182, which corresponds to modulated source voltage $V_{SOURCE}$ from source 180. More precisely, signal 182 is modulated in accordance with envelope signal 174.

Modulated voltage signal 182 is provided to RF PA 172 as its supply voltage $V_S$ via its voltage supply rail 184. Thus, envelope signal 174 dictates the amplitude of supply voltage $V_S$ of RF PA 172 in sync with the amplitude of output signal 178 to be produced by RF PA 172. It is noted that any necessary syncing provisions, such as a phase delay 186 and other measures (not shown) are well known in the art.

Under the above conditions, RF PA 172 operates in saturation mode, with high efficiency. Also note, that RF PA 172 in such embodiments may be a "class C" power amplifier.

Figure 3B:
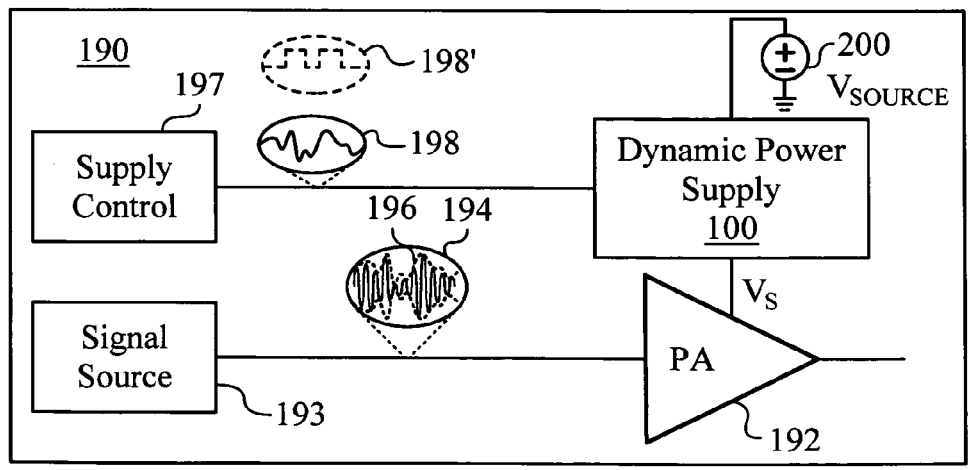
FIG. 3B is a diagram illustrating the deployment of a dynamic power supply according to the invention in a highly power-efficient, high-frequency power amplifier circuit.

FIG. 3B is a diagram illustrating the deployment of dynamic power supply 100 as illustrated in FIG. 1 or an analogous supply in a power-efficient, high-frequency circuit 190. Circuit 190 has a power amplifier 192 that may operate in the RF frequency range. Amplifier 192 is provided to amplify a signal 194 provided from a signal source 193 and required by circuit 190. Signal 194 varies within an envelope 196 that is indicated with a dashed line.

Once again, a signal 198 that varies as envelope 196 is used as control signal of dynamic power supply 100. Signal 198 is provided by a supply control 197. Necessary provisions are made to ensure that signal 198 is synchronized with signal 194. Also, a source voltage $V_{SOURCE}$ is provided from a voltage supply 200 of circuit 190. Voltage supply 200 is typically a battery.

In operation, dynamic power supply 100 modulates source voltage $V_{SOURCE}$ in accordance with signal 198. Modulated source voltage $V_{SOURCE}$ is used as supply voltage $V_S$ of amplifier 192, which amplifies signal 194. Supply voltage $V_S$ is thus modulated in sync with signal 198, which tracks envelope 196 of signal 194.

Amplifier 192 is preferably operated with sufficient overhead in supply voltage $V_S$ to be efficient. In fact, signal 198 provided by supply control 197 does not need to even be envelope 196 of signal 194 to be amplified. Signal 198 may be a square-wave approximation of envelope 196, as indicated by reference 198'. Of course, many alternative waveforms can be used as signal 198 to control the amplification of signal 194, as will be understood by those skilled in the art.

The amplification of signal 194 with changing amplitude in circuit 190 occurs very efficiently. This reduces the overall power consumption of circuit 190 and extends the life of battery 200.

FIG. 4 is a diagram of a dynamic power supply 202 that is very similar to dynamic power supply 100 of FIG. 1. The same reference numbers are used to designate corresponding parts whose operation has already been described above. Power supply 202 illustrates the additional benefits of capacitor 118. Note that voltage across capacitor 118, namely capacitor voltage $V_C$, is expressly indicated in FIG. 4.

In addition to parts already described in power supply 100, power supply 202 also has an optional low-pass filter 204 connected in series with regulator output 124. Filter 204 may be an inductor. It should be noted, however, that the use of an inductor as filter 204 may cause undesirable ringing and other undesirable side-effects. Therefore, additional measures may need to be deployed when an inductor is used as filter 204.

Power supply 202 is labeled with several points, namely points A through F, where the output voltage waveform is shown to better explain additional advantageous aspects of power supply 202. Graphs of voltage plots A and B, as shown in corresponding FIGS. 5A-B will now be used to clarify.

FIG. 5A shows Plot A in which voltage offset $V_{OS}$ applied by voltage offset source 148 is zero, i.e., $V_{OS}$=0. No offset or boost voltage is applied in this case. The upper part of Plot A shows output voltages from linear driver 102 (point A) and from switching regulator 120 (point C). The first voltage input source 112 supplying linear driver 102 (see FIG. 1), denoted as point D, must remain higher than the peak voltages output by linear driver 102, in order to provide sufficient operating headroom. As well, second voltage input source 126 supplying switching regulator 120, denoted as point F, must remain higher than the output from switching regulator 120. Note that in the preferred embodiment, switching regulator 120 is a step-down only regulator, which is the most efficient type (in contrast to step-up, or step-up/step-down types).

The bottom part of Plot A shows the resulting voltage waveform at point E. This is the output of dynamic power supply 202 at power output 138. Now compare these to the Plot B.

FIG. 5B shows Plot B, which illustrates what happens when a non-zero voltage offset $V_{OS}$ is applied by voltage offset source 148 to capacitor 118. In this case, switching regulator 120 maintains a fixed capacitor voltage $V_C$ as measured across capacitor 118. Thus, output of linear driver 102 at point A operates at a lower voltage than at point B. The top part of Plot B shows this, with point A now operating at much lower voltage levels.

The application of voltage offset $V_{OS}$ at control input 122 of switching regulator 120 thus generates a desirable DC offset at regulator output 124. The benefit is that driver supply voltage $V_{SLD}$ supplied from first input voltage source 112 to linear driver 102 via rail 114 can be stepped down (see FIG. 1). That is clear from Plot B, where linear driver 102 operates at a lower peak voltage level and no longer requires $V_{SLD}$ to be so high. Point D denotes $V_{SLD}$, shown here in PLOT B to be reduced compared with point D from Plot A. $V_{SLD}$ can be reduced because the output of linear driver 102 (denoted as point A) operates at a lower voltage in PLOT B than it did in PLOT A, and thus input voltage source 112 may be reduced while still providing sufficient operating headroom required for the driver to pass the signal.

The reducing or stepping down of $V_{SLD}$ is performed by a suitable step-down regulator. In supply 100 of FIG. 1 and in supply 202 of FIG. 4 the same regulator 150 (see FIG. 1) is used for this purpose. Preferably regulator 150 is a step-down switching regulator or DC-DC regulator that performs this step-down efficiently without wasting power. Therefore, the overall power supply efficiency is increased, since the efficiency of linear driver 102 is increased by operating at lowered $V_{SLD}$.

Looking at the bottom part of Plot B, another benefit is revealed. The peak signal voltage level at point E, i.e., at power output 138 can actually rise above supply voltages $V_{SLD}$ and $V_{SSR}$, supported by the boosting effect of offset voltage $V_{OS}$ at capacitor 118. The peaks above supply voltage $V_{SSR}$ can be achieved without a boost regulator, simplifying the system and further increasing efficiency. Thus, the preferred method of invention extends to applying voltage offset $V_{OS}$ at power output 124 via switching regulator's 120 supply voltage $V_{SSR}$, because this permits operation in a mode where the peak voltage provided by linear driver 102 is exceeded. Again, these advantages are especially desirable in mobile units where supply voltages $V_{SLD}$ and $V_{SSR}$ are provided by batteries.

In any of the above embodiments, first and second voltage sources 112, 126 can, in fact, be derived from same voltage source. This common source will usually be a battery. In particular, this is likely so in mobile devices that may have a single battery to power all of their circuits. Nevertheless, the ability to efficiently step down voltages required from such common battery, for example driver supply voltage $V_{SDL}$ that is lower than a regulator supply voltage $V_{SSR}$ in the preferred embodiment, represents a power savings. In devices that do not have a single common source, of course, the sources providing $V_{SDL}$ and $V_{SSR}$ may be entirely separate and distinct.

Alternatively, the voltage supply sources 112, 126 originate from different sources. This may occur in circuits and devices that are not restricted to a single battery. Indeed, these devices can have a distinct second input voltage source. The latter can be connected to switching regulator 120 for supplying it with a switching regulator supply voltage $V_{SSR}$ higher than driver supply voltage $V_{SLD}$.

FIG. 6 is a diagram of another embodiment of a dynamic power supply 300 in accordance with the invention. Power supply 300 illustrates a more specific implementation of several advantageous aspects of the invention. The same reference numerals as in prior drawing figures are used to designate corresponding parts.

As before, power supply 300 deploys linear driver 102 with capacitor 118 connected in series with driver output 108. Supply rail 114 of driver 102 receives its supply voltage $V_{SDL}$ from a corresponding source, e.g., a battery (not shown).

A negative feedback loop 302 that delivers negative feedback to second driver input 106, as before. Also, in this embodiment, a digital-to-analog converter (DAC) 308 sets a precise offset voltage $V_{OS}$, controlled by digital offset control input 306. Note that in a practical system, setting offset voltage $V_{OS}$ requires some knowledge of the expected peak levels expected at the output. This is related to the power level and modulation type, which is commonly known in a radio transmitter system, e.g., as shown in FIG. 3A.

Power supply 300 has a specific type of switching regulator 310 whose parts are shown in detail within the dashed box. Regulator 310 is a hysteretic-type switching regulator that provides regulator output current $i_{SR}$. Regulator 310 utilizes complementary switches 312, 314 to switch a switching inductor 316 between switching regulator supply voltage $V_{SSR}$ and ground GND in a step-down topology. Complementary switches 312, 314 are embodied by P-MOSFET and N-MOSFET transistors, respectively. A make-before-break circuit 318, known to those skilled in the art, ensures each switch is only activated after the previously active one is deactivated.

A current sense amplifier 320 provides a signal indicating current $i_{SR}$ in inductor 316 by measuring the voltage across a current sense resistor 322. Amplifier 320 is connected to an inverting input of a hysteretic comparator 324 to supply it with the signal indicating current $i_{SR}$.

Regulator 310 has at its control input 312 an error amplifier 326. In fact, the inputs of error amplifier 326 correspond to inputs 122A, 122B (see FIG. 1). As a result, error amplifier 326 receives an input signal corresponding to capacitor voltage $V_C$. The output of error amplifier 326 is supplied to the non-inverting input of hysteretic comparator 324. Thus connected to both error amplifier 326 and current sense amplifier 320, hysteretic comparator 324 controls make-before-break circuit 318 that actuates complementary switches 312, 314.

Summing node 328 is provided to sum currents $i_{LD}$ and $i_{SR}$ from linear driver 102 and switching regulator 310. As in the prior embodiment, summing node 328 is a wired summing node. A power output 330 is provided for connecting a load to the combined output signal.

A filter 332 may optionally be placed at the output of switching regulator 310. As remarked above, filter 332 could be embodied by an inductor if appropriate measures are taken to eliminate ringing and other deleterious side-effects. For an appropriate use of an inductor as filter 332 reference is made to co-pending U.S. Patent Application entitled "Low-Noise, High Bandwidth Quasi-Resonant Mode Switching Power Supply" filed on the same date as the present application.

The operation of power supply 300 is analogous to the operation of previously described embodiments. In other words, supply 300 operates in a "current mode" where $i_{LD}$ and $i_{SR}$ are summed at node 328 during operation and provided to drive a load (e.g., see FIG. 1).

FIG. 7 is a diagram of still another embodiment of a dynamic power supply 400 according to the invention designed to operate in a "voltage mode" rather than "current mode". In this case, the important output signals of linear driver 102 and switching regulator 310 are voltages, not currents. Thus, rather than detecting the DC and low frequency current components of a current signal, in the voltage mode dynamic power supply 400 uses a node 402 at driver output 108 for detecting the DC and low frequency voltage components in driver output voltage. For this reason, node 402 is connected to input 122B of switching regulator 310.

Power supply 400 deploys a digital-to-analog converter (DAC) 404 to set a precise offset voltage $V_{OS}$. Voltage $V_{OS}$ is applied to input 122B of switching regulator 310. Thus, regulator 310 attempts via its output to boost the voltage at an output capacitor 406. It does so in order to servo the average voltage output of linear driver 102 to the $V_{OS}$.

Power supply 400 deploys a summing transformer 408 for adding the voltages from driver 102 and switching regulator 310. A power output 410 is provided after a node 412 that closes the feedback loop of driver 102 after transformer 408.

During operation, switching regulator 310 regulates its regulator output to minimize the difference between the DC and low frequency components present at driver output 108 and externally-supplied offset voltage $V_{OS}$ from DAC 404 utilizing its regulator feedback loop. To accomplish this, switching regulator 310 generates at its regulator output a regulator output voltage that satisfies the driver's feedback loop and thus force the driver's DC output voltage to equal the offset voltage $V_{OS}$. Capacitor 118 isolates the DC level of driver output 108, ensuring that the DC component is advantageously provided entirely by switching regulator 310, in a manner similar to that described in the "current mode" schemes of FIGS. 1, 4 and 6.

Summing transformer 408 combines the driver output voltage and the regulator output voltage at power output 410 in the present and other voltage mode embodiments. A capacitor 414 may be provided as a reservoir capacitor for regulator 310, to reduce the voltage ripple produced by the switching currents from inductor 316. In the case where capacitor 414 is not included in the circuit, inductor 316 may also be removed, and the primary winding of transformer 408 may also serve the function of switching inductor 316.

A regulator for stepping down the driver supply voltage $V_{SLD}$ from the first input voltage source based on the DC offset can also be deployed in these embodiments. Thus, advantageously, linear driver 102 may be powered from a lower supply voltage $V_{SLD}$ related to the setting of offset voltage $V_{OS}$, in a manner similar to that described in the "current mode" scheme.

In view of the above teaching, a person skilled in the art will recognize that the apparatus and method of invention can be embodied in many different ways in addition to those described without departing from the spirit of the invention. Therefore, the scope of the invention should be judged in view of the appended claims and their legal equivalents.

We claim:

1. A dynamic power supply for regulating a power output by a control signal, said dynamic power supply comprising:
   a) a linear driver having:
      1) a first driver input for receiving said control signal having a predetermined bandwidth;
      2) a driver output for generating a driver output current;
      3) a second driver input connected to said power output for receiving a negative feedback;
   b) a capacitor connected in series with said driver output for generating a capacitor voltage responsive to DC and low frequency current components in said driver output current;
   c) a switching regulator having a control input and a regulator output connected in a regulator feedback loop, wherein said control input is connected to receive said capacitor voltage and said regulator feedback loop minimizes said capacitor voltage thereby generating at said regulator output a regulator output current comprising said DC and low frequency current components, wherein said control input receiving said capacitor voltage further receives a voltage offset from an offset voltage source, thereby generating a DC offset in said driver output; and
   d) a combiner for combining said driver output current and said regulator output current to yield said power output.

2. The dynamic power supply of claim 1, wherein said combiner is a wired summing node.

3. The dynamic power supply of claim 1, further comprising a regulator for stepping down a driver supply voltage from a first input voltage source based on said DC offset.

4. The dynamic power supply of claim 3, wherein said first input voltage source comprises a battery, said battery being connected to said switching regulator for supplying a switching regulator supply voltage.

5. The dynamic power supply of claim 3, further comprising a second input voltage source being connected to said switching regulator for supplying a switching regulator supply voltage higher than said driver supply voltage.

6. The dynamic power supply of claim 1, wherein said predetermined bandwidth is at least 100 kHz.

7. The dynamic power supply of claim 6, further comprising a low-pass filter connected in series with said switching regulator before said combiner.

8. A method for regulating a power output of a dynamic power supply by a control signal, said method comprising:
   a) providing a linear driver having a first driver input, a second driver input and a driver output;
   b) connecting said first driver input to receive said control signal having a predetermined bandwidth and generate a driver output current at said driver output;
   c) connecting said second driver input to said power output for receiving a negative feedback;
   d) connecting in series with said driver output a capacitor for generating a capacitor voltage responsive to DC and low frequency current components in said driver output current;
   e) providing a switching regulator having a control input and a regulator output connected in a regulator feedback loop, wherein said control input receives said capacitor voltage and said regulator feedback loop minimizes said capacitor voltage thereby generating at said regulator output a regulator output current comprising said DC and low frequency current components;
   f) combining said driver output current and said regulator output current to yield said power output; and
   g) applying a voltage offset at said power output via said switching regulator, thereby causing the power output to exceed a peak voltage provided by said linear driver.

9. The method of claim 8, wherein said power output is delivered to a supply voltage rail of an RF power amplifier, and said control signal comprises an RF modulated signal to be modulated onto an RF carrier by said dynamic power supply.

10. The method of claim 8, wherein said power output modulates an RF power amplifier supply voltage in accordance with a signal to be amplified by said RF power amplifier.

11. A method for regulating a power output of a dynamic power supply by a control signal, said method comprising:
   a) providing a linear driver having a first driver input, a second driver input and a driver output;
   b) connecting said first driver input to receive said control signal having a predetermined bandwidth and generate a driver output current at said driver output;
   c) connecting said second driver input to said power output for receiving a negative feedback;
   d) connecting in series with said driver output a capacitor for generating a capacitor voltage responsive to DC and low frequency current components in said driver output current;
   e) providing a switching regulator having a control input and a regulator output connected in a regulator feedback loop, wherein said control input receives said capacitor voltage and said regulator feedback loop minimizes said capacitor voltage thereby generating at said regulator output a regulator output current comprising said DC and low frequency current components;
   f) adding a voltage offset from an offset voltage source to said control input, thereby generating a DC offset in said driver output; and
   g) combining said driver output current and said regulator output current to yield said power output.

12. The method of claim 11, further comprising stepping down an input voltage source to apply a stepped-down driver supply voltage to said linear driver when said voltage offset is applied.

13. A dynamic power supply for regulating a power output by a control signal, said power supply comprising:
   a) a linear driver having:
      1) a first driver input for receiving said control signal having a predetermined bandwidth;
      2) a driver output for generating a driver output voltage;
      3) a second driver input connected to said power output for receiving a negative feedback;
   b) a node at said driver output for sampling DC and low frequency voltage components in said driver output voltage;
   c) a switching regulator having a control input and a regulator output connected in a regulator feedback loop, wherein said control input is connected to an offset voltage source and to said node for receiving said DC and low frequency voltage components and said regulator feedback loop minimizes said DC an low frequency voltage components thereby generating at said regulator output a regulator output voltage comprising a DC offset and said DC and low frequency voltage components; and
   d) a summing transformer for combining said driver output voltage and said regulator output voltage to yield said power output.

14. The dynamic power supply of claim 13, further comprising a regulator for stepping down a driver supply voltage from a first input voltage source based on said DC offset.

15. The dynamic power supply of claim 13, wherein said predetermined bandwidth is at least 100 kHz.

* * * * *

UNITED STATES PATENT AND TRADEMARK OFFICE
CERTIFICATE OF CORRECTION

PATENT NO. : 8,952,753 B2  
APPLICATION NO. : 13/385406  
DATED : February 10, 2015  
INVENTOR(S) : David C. G. Tournatory et al.

Page 1 of 1

It is certified that error appears in the above-identified patent and that said Letters Patent is hereby corrected as shown below:

In the Claims:

Column 16, Line 36, Claim 13, delete "an" and insert -- and --.

Signed and Sealed this  
Twelfth Day of April, 2016

Michelle K. Lee  
*Director of the United States Patent and Trademark Office*